April 30, 1929.  H. J. MURRAY  1,710,708
FLEXIBLE SWITCH CONTROL
Filed Nov. 12, 1924  2 Sheets-Sheet 2
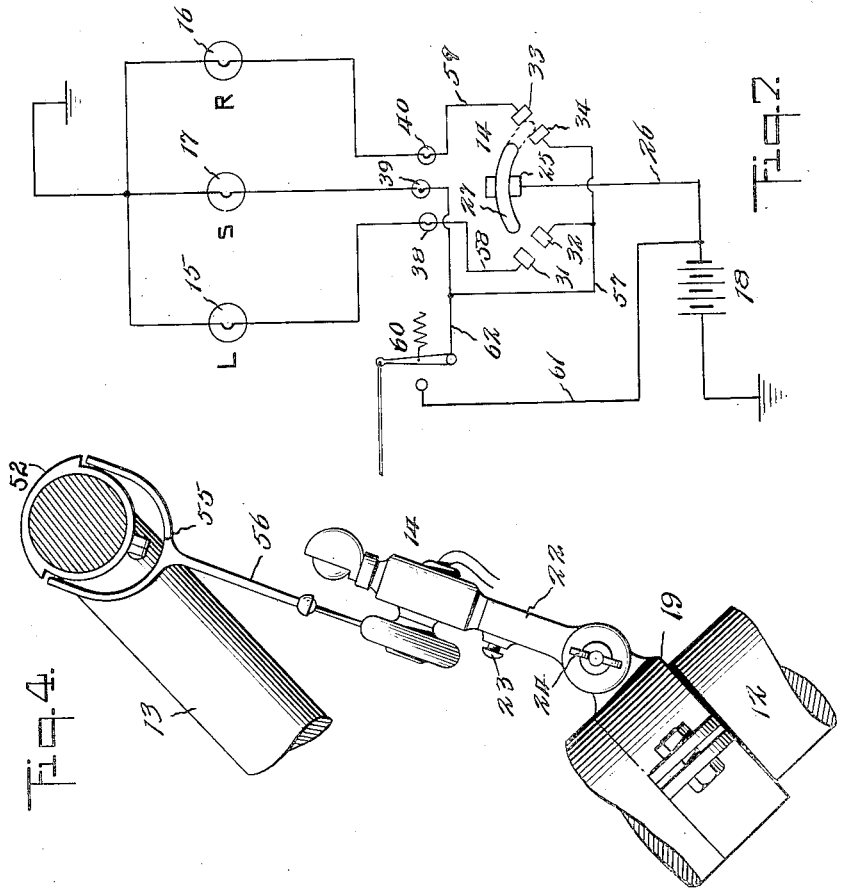
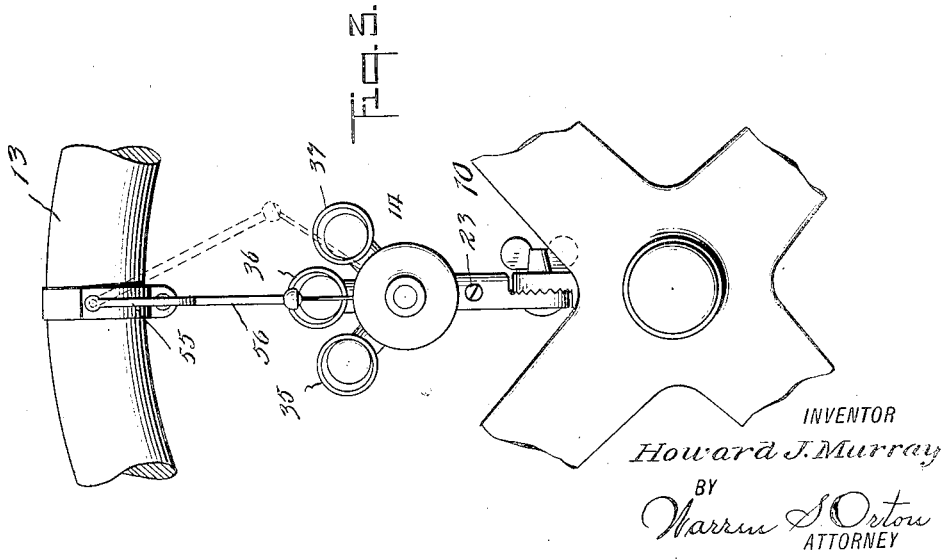
INVENTOR
Howard J. Murray
BY
Warren S. Orton
ATTORNEY Patented Apr. 30, 1929.

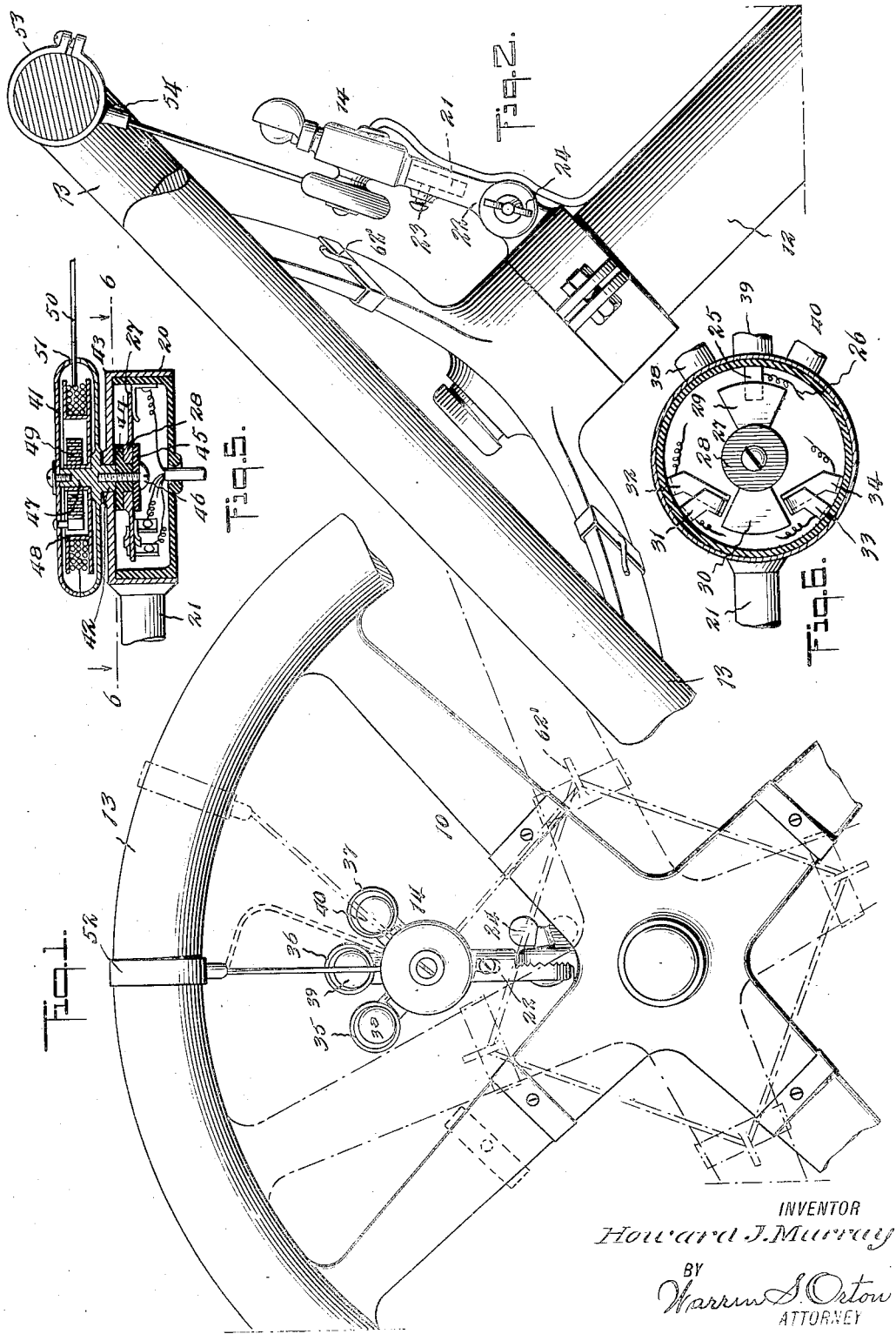

1,710,708

UNITED STATES PATENT OFFICE.

HOWARD J. MURRAY, OF BROOKLYN, NEW YORK, ASSIGNOR TO R. M. COMPANY, INC., OF EAST PITTSBURGH, PENNSYLVANIA, A CORPORATION OF DELAWARE.

FLEXIBLE SWITCH CONTROL.

Application filed November 12, 1924. Serial No. 749,378.

The invention relates to a traffic signalling device of the type commonly found on automotive vehicles for the purpose of indicating the intent of the operator to effect a turning or a stopping or slowing down of the vehicle.

More specifically defined the invention relates to a manually actuated switch for the several indicating signals usually found on automotive vehicles and which switch may be operated as a positive overt act on the part of the operator or may be operated incidental to the movement of the steering wheel in effecting its steering operation or to the movement of some other part of the vehicle mechanism.

The primary object of the invention is to provide a simplified form of switch which can be marketed as a unit designed to be installed on any conventional form of steering column and easily connected to the rim or other rotatable part of the steering wheel, irrespective of its size, configuration or extent of rotary movement incidental to its steering action.

Broadly I attain this phase of the invention by disposing a switch in any convenient position, preferably on the steering column and connecting the movable switch element with the rim or other part of the wheel through the agency of a flexible connector. The connector is arranged so that it will act to shift the movable element of the switch either by the rotary movement of the wheel or by the manual engagement on the part of the operator with an exposed part thereof when he desires to cause the selected signals to function independent of the rotary movement of the steering wheel.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Fig. 1 is a plan view of a portion of an automotive vehicle steering wheel with a preferred embodiment of the invention mounted thereon;

Fig. 2 is a view in side elevation of the parts shown in Fig. 1;

Figs. 3 and 4 are detailed views in part corresponding to the showing in Figs. 1 and 2 respectively and illustrating a slightly modified form of connection with the wheel rim;

Fig. 5 is an enlarged detailed view in axial section of the switch shown in the preceding figures;

Fig. 6 is a sectional view taken on the plane indicated by the line 6—6 of Fig. 5 looking in the direction indicated by the arrows; and Fig. 7 is a diagrammatic showing of the switch parts shown in operative connection with the electric devices controlled thereby on the vehicle.

In the drawings there is shown part of a steering wheel 10 mounted for rotary movement on the fixed column 12 and provided with the usual steering rim 13. It will be further assumed that the vehicle is provided with some suitable form of signalling indicators herein shown to be of an electrically actuated type and controlled selectively by a circuit closer 14 particularly constituting the subject-matter of this disclosure.

There is shown diagrammatically in Fig. 7 a left indicating signal 15; a right indicating signal 16 and a stop, slow or other warning signal 17. These signals are supplied from one side of a source of energy 18, the other side of which source is grounded on the machine.

Referring to the circuit closer 14 it is intended that the same be marketed as a unit together with the necessary attaching means herein shown to be a strap 19 for encircling the column 12. In general means are provided for securing the circuit closer in desired fixed position relative to the wheel and preferably in an out-of-the-way position beneath the steering wheel. The circuit closer includes a main casing 20 mounted on a post 21 adjustably mounted in an arm 22 and secured in radially adjusted position by means of a set screw 23. The arm 22 is secured to the strap 19 for adjusted rotary movement vertically and is secured in its adjusted position by means of a wing nut 24.

The main portion of the casing 20 is in the form of an open top cylindrical cup formed of insulating material and provided with a plurality of fixed contacts included in the circuits hereinafter defined. These contacts include a main current supplying contact 25 connected to the source of energy through the main lead 26; the fixed contact 25 is at all times in electric engagement with a movable contact element 27 of the switch and is mounted for rotary movement about the axis of the casing as hereinafter described. The movable contact comprises a central hub 28 with two oppositely extending segmental wings 29 and 30 of which the wing 29 is in electric contact with the contact 25 in all positions of the movable contact. The opposite wing 30 is designed when shifted in one direction to convey current simultaneously to two fixed contacts 31 and 32; and when shifted in the opposite direction to similarly engage and convey current to two other contacts 33 and 34. The two sets of contacts are secured to the side of the casing 20 and are circumferentially spaced apart as shown in Fig. 6.

Extending radially from one side of the casing 20 herein shown to be the forward side or the side opposite the mounting rod 21 are three small lamps 35, 36, and 37 equipped respectively with electric light bulbs 38, 39, and 40 and disposed so as to be visible to the operator manipulating the switch and operatively connected in the signal circuits to indicate to the operator the operativeness of the signals as hereinafter disclosed.

The movable contact of the switch is controlled in its rotary movement to and from its circuit closing position by means of a cylindrical casing 41, provided on one side with an axially extending hub 42 rotatably mounted in an enclosing cover section 43 of the casing 20. The hub 28 of the movable contact is secured between a pair of insulating washers 44 and 45 and the unit so formed is secured to the hub by means of a screw 46. From this construction it is apparent that a rotation of the casing 41 about its axis will shift the movable contact element of the switch. Rotatably mounted upon a cylindrical bearing 47 constituting an inward extension of the hub 42 is a drum 48. This drum is resiliently connected to the casing 41 by means of a spiral spring 49 which has one end secured to the drum and the other to the casing. A flexible connector 50 has one portion coiled on the drum 48; extends through an opening 51 in the side of the casing and has its other end connected to the rim of the steering wheel. It will be understood in general that the construction thus described resembles somewhat the spring-wound tape-measures now in general use.

The free end of the flexible connector normally extends radially from the switch across an open space between adjacent spokes of the wheel and is secured to the rim in pre-located position by means of a fastener 52. This fastener may be a split ring strap 53 clamped to the rim and provided with a clamping screw head 54 secured rigidly to the ring as shown in Fig. 2, or as shown in the modification illustrated in Figs. 3 and 4, the screw clamp 54 may be pivotally connected to the split ring 43 through the medium of a pivotal yoke 55. In this case the arm 56 of the yoke provides a convenient means for the manual engagement with the flexible connector when it is desired to actuate the switch manually and as shown in dotted lines in Fig. 3 which provides for a powerful leverage effect on the flexible connector.

Referring to the electrical connections specifically shown in Fig. 7 it is seen that the contacts 32 and 34 are connected by means of a conductor 57 with the warning signal 17 and included in this circuit is the small test light 39 carried by the switch. From this construction it is obvious that the rotation of the movable contact in either direction will close the circuit through the warning signal 17 and at the same time indicate to the operator by means of the test light 39 that the warning signal is functioning.

Contact 31 is connected by means of conductor 58 with the left indicating signal 15 in which circuit is included the test light 38. Similarly the switch contact 33 is connected with the right indicating signal 16 through conductor 59 in which circuit is included the right test light 40. The circuit through all of the indicators is grounded on the machine as indicated in Fig. 7.

It is further suggested that the warning signal 17 be actuated automatically by the movement of some part of the vehicle control other than the steering mechanism, such for instance as the clutch or brake. For this purpose there is disclosed in Fig. 7 a showing of a switch 60 which can be closed to connect the battery through conductor 61, switch 60 and conductor 62 to the circuit containing the warning signal 17 as is usual in known structures of this character. The present disclosure distinguishes from known forms of clutch or brake controlling mechanisms for causing the stop or slow signal to function in that with each closing of the switch actuated by the vehicle control part the test light 39 will flash simultaneously with the warning signal and thus advise the operator that this part of the system is functioning.

Each of the spokes is provided with a finger 62' disposed in the path of movement of the flexible connector as it is run off the drum so that as the steering rim is rotated relative to the fixed switch the flexible connector will be trained about one or more of the fingers as indicated in dotted lines in Fig. 1.

In operation and assuming that the parts are disposed in position as indicated in full lines in the several figures, it is understood that the operator may engage the flexible connector with his finger or thumb and move the connector laterally and into offset position as indicated either in Figs. 1 or 3. This lateral shifting of the portion of the flexible connector which extends through and from the aperture 51 causes the connector to bear on one or the other side of the aperture depending upon the direction of pull of the flexible connector with relation to the normal position of the aperture. The sides of the apertures thus act as stops to be engaged by the actuator and a pull in one or the other directions against the stop will cause the casing to rotate as a whole about its axis and thus shift the movable contact from the normal position shown in Figs. 6 and 7 into engagement with one of the sets of contacts 31, 32 or 33, 34 depending upon the direction of rotation of the movable connector. Assuming for illustration, that the operator desires to indicate an intent to turn to the right and has pushed the flexible connector into the position shown in Figs. 1 and 2; this would have the effect of switching the movable contact into the position shown in dotted lines in Fig. 7. Current can then be traced from the battery through conductor 26 and through contacts 25 to contacts 33 and 34. From contact 34 current is lead through the signals 39 and 17 to ground. The current is similarly lead from contact 33 through conductor 59 through signals 40 and 16 to the ground. In this way it is apparent that with each actuation of the direction indicating signal, such as the right signal in the instant case, there is also and simultaneously actuated the warning signal 17 as well as the two corresponding test signals 39 and 40. As the flexible connector is drawn from the casing, it incidentally unwinds from the drum and winds the drum spring under tension.

Similarly a movement of the flexible connector in the opposite direction will close the circuit through the left indicating signal, the warning signal and through their associated test lights.

Releasing tension on the conductor will permit the drum spring to rewind the loose portion of the connector and thus in taking up slack restore the parts to their normal position. The replacing of the steering wheel in its normal forward driving position will cause the connector to shift the drum casing to its normal position thus breaking circuit through the previously actuated signals.

It is apparent that this same selective actuation of the switch may be obtained automatically by the rotary movement of the steering wheel. For instance, should the wheel be turned to the right in effecting a steering operation in that direction the flexible connector will be moved first into the position indicated in dot and dash lines in Fig. 1. This will have the same effect as was caused by the previously described manual operation; the drum casing will be rotated to close the switch as previously described and the switch will be held in its circuit closing position as long as the steering wheel is rotated from its normal straight driving position. The present construction permits of any amount of rotary movement of the steering wheel. The steering wheel can be rotated beyond the point where it causes the closing of the switch and the continued rotation of the wheel simply means that the flexible connector is drawn off its drum and wrapped about the steering column or wrapped about the perimeter provided by the fingers 62'. This continued movement of the steering wheel will have no effect upon the continuity of the circuit closing position of the switch and the switch is maintained in such condition until the steering wheel is re-rotated back into position to restore the drum casing to its normal position. The contacts 31, 32, 33 and 34 are so positioned relative to the movable contact wing 30 and this wing is proportioned so that the closing of the circuit is delayed until a desired degree of rotation of the steering wheel is provided for actuating the signal. In other words it is not desired that the signal function with each small degree of turning of the steering wheel as would be the case when the vehicle is simply weaving its way through traffic on a straightaway course.

By means of a device of the character disclosed it is possible to provide a simple form of construction which can be readily mounted upon different types of steering mechanism and which is available for automatic or manual actuation without necessity of modifying or changing any of the convention parts of the steering device to accommodate it. The operator is at all times assured of the operativeness of the system by means of the testing devices provided and which devices may be tested either by the operation of the steering wheel, clutch, brake or other mechanical parts or simply by manual actuation of the control.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a device of the class described, the combination of a vehicle steering column, and a steering wheel carried thereby, rotatable relative thereto, and provided with a rim, a strap clamped to the steering column, a circuit closer pivotally mounted on the strap for adjustment relative to the wheel, a spring controlled drum carried by the circuit closer, operatively connected to the movable element thereof and acting to return the same normally to an inoperative circuit opened position, a flexible connector partially wound on said drum and having its free end operatively connected to the wheel rim whereby a rotary movement of the wheel will act on the drum and thus cause the movable element of the switch to shift from its normal position, and means carried by the wheel adapted to be engaged by the flexible connector as the wheel is rotated relative to the circuit closer.

2. In a device of the class described, the combination of a vehicle steering column, and a steering wheel carried thereby, rotatable relative thereto, and provided with a rim, a strap clamped to the steering column, a circuit closer pivotally mounted on the strap for adjustment relative to the wheel, a spring controlled drum carried by the circuit closer, operatively connected to the movable element thereof and acting to return the same normally to an inoperative circuit opened position, and a flexible connector wound on said drum and having its free end operatively connected to the wheel rim whereby a rotary movement of the wheel will act on the drum and thus cause the movable element of the switch to shift from its normal position.

3. In a device of the class described, the combination of a vehicle steering wheel, a circuit closer including a bracket for adjustably mounting the same to a fixed support, said circuit closer including a movable control member and a flexible means between the control member and the wheel operatively connecting the same whereby rotary movement of the wheel will automatically shift said control member and said flexible means being exposed for engagement whereby the control member may be shifted manually and independent of the rotary movement of the steering wheel.

4. In a device of the class described, the combination with a fixed vehicle steering column provided with a steering wheel having a rim, of a circuit closer mounted on the fixed column and including a movable control member, and a flexible connection between the control member and the wheel rim whereby the control member is moved automatically by the rotation of the steering wheel and/or by manual pressure on the flexible connection.

5. In a device of the class described, the combination of a vehicle steering wheel, a switch fixed in position, and having a movable control element and a flexible connection between the control element and the wheel whereby rotary movement of the wheel will act through the flexible connection to shift the control element and said flexible connection having a length sufficiently long to permit the same to be wrapped about the steering column of the wheel and means acting on the flexible connection for taking up the slack as the wheel is rotated in either direction from its normal position incidental to steering.

6. In a device of the class described, the combination of a vehicle steering wheel, a switch fixed in position and having a movable control element and a flexible connection between the control element and the wheel in all rotative positions of the wheel whereby rotary movement of the wheel will act through the flexible connection to shift the control element and said flexible connection having a length sufficiently long to permit the same to be wrapped about the steering column of the wheel.

7. In a device of the class described, the combination of a steering wheel, a circuit closer mounted in fixed position adjacent the center of the wheel, and means for controlling the circuit closer, said means including a part extending between and providing a permanent connection between the circuit closer and the wheel in all relative positions of the circuit closer and wheel and operatively connected to be actuated by the rotation of the wheel and said part providing for manual engagement whereby the switch may be actuated either at will manually or automatically by the rotation of the wheel.

8. In a device of the class described, the combination of a vehicle steering wheel, a control switch mounted in relatively fixed position adjacent the axis of the steering wheel, and a flexible control member normally extending radially of the wheel and connecting the movable element of the switch with a rotatable part of the steering wheel and presenting a part for manual actuation independent of the rotation of the wheel.

9. A switch including a main casing designed to be mounted in fixed position and provided with a fixed contact, a coacting contact mounted for rotary movement in the casing, a second casing positioned exteriorly of the main casing and secured to the movable contact to rotate therewith, a drum mounted for rotary movement in the second casing, a coiled spring connection between the drum and second casing, a flexible actuator having an end wound on the drum, projecting through the side of the second casing and acting thereon to rotate the same and thus shift the movable contact and a rigid connector secured to the free end of the flexible actuator.

10. A switch including a main casing designed to be mounted in fixed position and provided with a fixed contact, a coacting contact mounted for rotary movement in the casing, a second casing positioned exteriorly of the main casing and secured to the movable contact to rotate therewith, a drum mounted for rotary movement in the second casing, a coiled spring connection between the drum and second casing, and a flexible actuator having an end wound on the drum, projecting through the side of the second casing and acting thereon to rotate the same and thus shift the movable contact.

11. A circuit closer adapted to be mounted on a vehicle steering mechanism and provided with a movable control element, and a flexible connection with the movable element adapted to have its free end secured to the wheel and to have a portion exposed for manual engagement thereby providing for manual actuation of the circuit closer irrespective of the relative positions of the wheel.

12. A circuit closer for use in connection with a vehicle steering wheel including a movable control member provided with means for mounting the same in fixed position and a connector leading from the control member and provided with fastening means adapted to be secured to the rim of the steering wheel.

13. In a switch, a control element mounted for rotary movement, means rotatable with the control element and providing a pair of stops offset from the axis of rotation of said means, a flexible connector extending between said stops and adapted to be shifted laterally into bearing engagement with either one of the stops thereby to shift the control element in either rotary direction depending on the direction in which the flexible actuator is shifted.

14. In a switch, the combination of a control element, a casing secured thereto to rotate therewith, said casing provided with an aperture at its periphery, a flexible member extending through the aperture and adapted to bear on the casing to shift the control element in the direction of pull of the flexible member and a drum in the casing on which the flexible member is adapted to be wound.

15. In a switch, the combination of a control element, a casing secured thereto to rotate therewith, said casing provided with an aperture at its periphery, a flexible member extending through the aperture and adapted to bear on the casing to shift the control element in the direction of pull of the flexible member.

16. An electric switch provided with a movable control element having a normal inoperative position and two circuit closing positions on opposite sides of the normal position, a drum operatively connected with the element to shift the same to and from its several positions and a flexible actuator wound on the drum and acting therethrough to shift the control element from its normal into one of its operative positions.

17. In a device of the class described, the combination of a circuit closer provided with means for mounting the same in fixed position and having a movable contact member, a flexible connector having one end operatively connected to the movable contact member to shift the same and fastening means for pivotally securing the other end of the connector to a steering wheel rim.

18. In a device of the class described, the combination of a circuit closer provided with means for mounting the same in fixed position and having a movable contact member, a flexible connector having one end operatively connected to the movable contact member to shift the same, a wheel rim engaging member connected to the other end of the flexible connector and tension means acting on the flexible connector to maintain said member in position extending radially of the wheel rim.

19. A switch provided with a fixed contact, a coacting contact mounted for rotary movement, a drum casing secured to the movable contact to rotate therewith, a spring controlled drum in said casing, a flexible control having an end portion wound on said drum and having another portion projecting from the casing and acting on the casing to rotate the same.

20. A switch including a rotatable control member, a flexible actuator operatively connected to the control member to shift the same in either direction depending on the direction of pull of the flexible actuator and means for taking up slack in the flexible actuator.

Signed at New York, in the county of New York and State of New York, this 1st day of November, A. D. 1924.

HOWARD J. MURRAY.